US009890483B2

(12) United States Patent
Hayashi (10) Patent No.: US 9,890,483 B2
(45) Date of Patent: Feb. 13, 2018

(54) FIBER-REINFORCED COMPOSITE MATERIAL AND METHOD FOR MANUFACTURING THE SAME

(71) Applicant: TOYOTA JIDOSHA KABUSHIKI KAISHA, Toyota-shi, Aichi (JP)

(72) Inventor: Koichiro Hayashi, Anjo (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 154 days.

(21) Appl. No.: 14/614,831

(22) Filed: Feb. 5, 2015

(65) Prior Publication Data

US 2015/0240396 A1    Aug. 27, 2015

(30) Foreign Application Priority Data

Feb. 21, 2014 (JP) ................................. 2014-032189

(51) Int. Cl.
*D03D 15/00* (2006.01)
*B32B 5/02* (2006.01)
(Continued)

(52) U.S. Cl.
CPC ....... *D03D 15/0027* (2013.01); *B29C 70/081* (2013.01); *B29C 70/465* (2013.01);
(Continued)

(58) Field of Classification Search
CPC ... B29C 70/547; B29C 70/465; B29C 70/081; D03D 13/008; D03D 13/00; D03D 1/00;
(Continued)

(56) References Cited

U.S. PATENT DOCUMENTS

| 2004/0142618 A1* | 7/2004 | Porter ................. B28B 19/0092 442/266 |
| 2005/0266224 A1 | 12/2005 | Husler et al. |
| 2016/0023428 A1* | 1/2016 | Adams ................... B32B 5/022 442/57 |

FOREIGN PATENT DOCUMENTS

| JP | 60-50146 B2 | 11/1985 |
| JP | 4-71842 A | 3/1992 |

(Continued)

OTHER PUBLICATIONS

Notice of Allowance dated Mar. 1, 2016 from the Japanese Patent Office in corresponding application No. 2014-032189.

(Continued)

*Primary Examiner* — Camie S Thompson
(74) *Attorney, Agent, or Firm* — Sughrue Mion, PLLC (57) ABSTRACT

A fiber-reinforced composite material for increasing adhesive strength between a first composite material layer including a fibrous substrate with reinforcement fiber bundles arranged crosswise, and a second composite material layer including second reinforcement fibers arranged randomly. The first composite material layer including a fibrous substrate having reinforcement fiber bundles crossing and being drawn and aligned first reinforcement fibers; and first thermoplastic resin, with at least each of the reinforcement fiber bundles is impregnated; and a second composite material layer including second reinforcement fibers arranged randomly in second thermoplastic resin. The first composite material layer and the second composite material layer bonded to each other. The first composite material layer has bores on at least a surface thereof that is to be bonded with the second composite material layer. The second reinforcement fibers and the second thermoplastic resin enter into the bores.

4 Claims, 7 Drawing Sheets (51) Int. Cl.

| | | |
|---|---|---|
| *B32B 3/00* | (2006.01) | |
| *B32B 5/26* | (2006.01) | |
| *B32B 37/04* | (2006.01) | |
| *B32B 3/06* | (2006.01) | |
| *B32B 3/30* | (2006.01) | |
| *D03D 1/00* | (2006.01) | |
| *D03D 13/00* | (2006.01) | |
| *B32B 27/12* | (2006.01) | |
| *B32B 27/20* | (2006.01) | |
| *B32B 27/28* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |
| *B32B 27/38* | (2006.01) | |
| *B32B 3/26* | (2006.01) | |
| *B29C 70/46* | (2006.01) | |
| *B29C 70/54* | (2006.01) | |
| *B29C 70/08* | (2006.01) | |

(52) U.S. Cl.
CPC ............. *B29C 70/547* (2013.01); *B32B 3/06* (2013.01); *B32B 3/266* (2013.01); *B32B 3/30* (2013.01); *B32B 5/022* (2013.01); *B32B 5/024* (2013.01); *B32B 5/26* (2013.01); *B32B 27/12* (2013.01); *B32B 27/20* (2013.01); *B32B 27/281* (2013.01); *B32B 27/302* (2013.01); *B32B 27/308* (2013.01); *B32B 27/32* (2013.01); *B32B 27/34* (2013.01); *B32B 27/365* (2013.01); *B32B 27/38* (2013.01); *B32B 37/04* (2013.01); *D03D 1/00* (2013.01); *D03D 13/008* (2013.01); *B32B 2250/02* (2013.01); *B32B 2250/20* (2013.01); *B32B 2260/021* (2013.01); *B32B 2260/04* (2013.01); *B32B 2260/046* (2013.01); *B32B 2262/0253* (2013.01); *B32B 2262/0261* (2013.01); *B32B 2262/0269* (2013.01); *B32B 2262/101* (2013.01); *B32B 2262/105* (2013.01); *B32B 2262/106* (2013.01); *B32B 2315/02* (2013.01); *B32B 2377/00* (2013.01); *D10B 2101/12* (2013.01); *D10B 2331/02* (2013.01); *D10B 2505/02* (2013.01); *Y10T 156/1002* (2015.01); *Y10T 442/3171* (2015.04)

(58) Field of Classification Search
CPC ....... B32B 2250/20; B32B 60/04; B32B 3/30; B32B 5/022; B32B 5/024; B32B 5/028; B32B 5/12; B32B 5/026; B32B 2260/023; B32B 2260/00; B32B 2260/04; B32B 2305/38; B32B 2250/02; B32B 3/06; B32B 37/04; B32B 2250/03; B32B 2255/02; B32B 2260/02; B32B 2260/046; B32B 5/10; B32B 5/142; B32B 5/145; B32B 5/28; B32B 5/26; B32B 3/266; Y10T 442/335; Y10T 442/3472; Y10T 442/3594; Y10T 442/3667; Y10T 442/3732; Y10T 442/652; D10B 2505/02
USPC ........ 428/212; 442/220, 224, 226, 239, 254, 442/271, 374, 1, 50, 58, 238, 263, 244, 442/245, 246, 247
See application file for complete search history.

(56) References Cited

FOREIGN PATENT DOCUMENTS

| | | |
|---|---|---|
| JP | 7-299887 A | 11/1995 |
| JP | 11-107107 A | 4/1999 |
| JP | 2005-297417 A | 10/2005 |
| JP | 2005-538864 A | 12/2005 |
| JP | 2012-51151 A | 3/2012 |
| JP | 2012-125948 A | 7/2012 |
| JP | 201322852 A | 2/2013 |
| JP | 2013-56474 A | 3/2013 |
| JP | 2013-198984 A | 10/2013 |
| WO | 2009/142291 A1 | 11/2009 |

OTHER PUBLICATIONS

Notice of Reasons for Rejection dated Dec. 8, 2015 from the Japanese Patent Office in corresponding application No. 2014-032189.

* cited by examiner

FIBER-REINFORCED COMPOSITE MATERIAL AND METHOD FOR MANUFACTURING THE SAME

BACKGROUND

Technical Field

The present invention relates to a fiber-reinforced composite material including reinforcement fibers and thermoplastic resin, and a method for manufacturing the same.

Background Art

Fiber-reinforced composite materials including reinforcement fibers and matrix resin (hereinafter called resin) are lightweight compared with metal materials and have high mechanical strength and elasticity due to the reinforcement fibers included therein compared with resin materials, and so have recently attracted attention.

For example, a fiber-reinforced composite material such as a sheet molding compound as its example includes reinforcement fibers arranged at random, and has better moldability than materials including woven cloth-form reinforcement fibers as reinforcement fibers. Such a material, therefore, can make a compact in a complicated shape easily, and has high productivity as well.

Such a fiber-reinforced composite material, however, includes reinforcement fibers arranged at random, and so has low mechanical strength compared with those including woven-cloth form reinforcement fibers. Then, when a compact in a more complicated shape is to be formed as stated above, the compact formed may have a part having insufficient stiffness. For some parts to which the compact is used, a part of the compact may undergo local load applied thereto. In such cases, the compact has to be reinforced partially at such a part of inefficient stiffness or of undergoing local load applied to prevent damage at the compact.

Figure 9A:
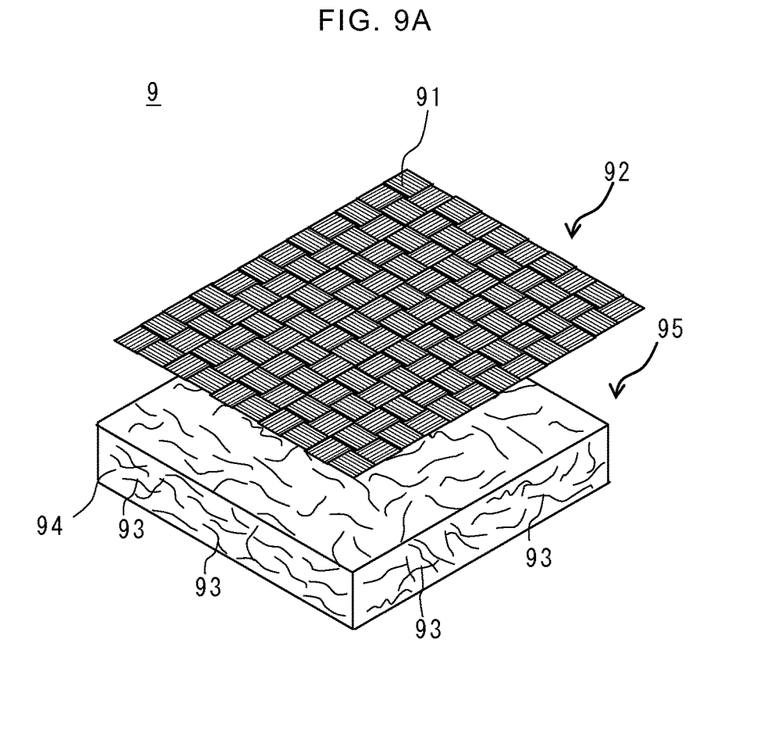
FIG. 9A is a schematic perspective view to describe a conventional method for manufacturing a fiber-reinforced composite material.
Figure 9B:
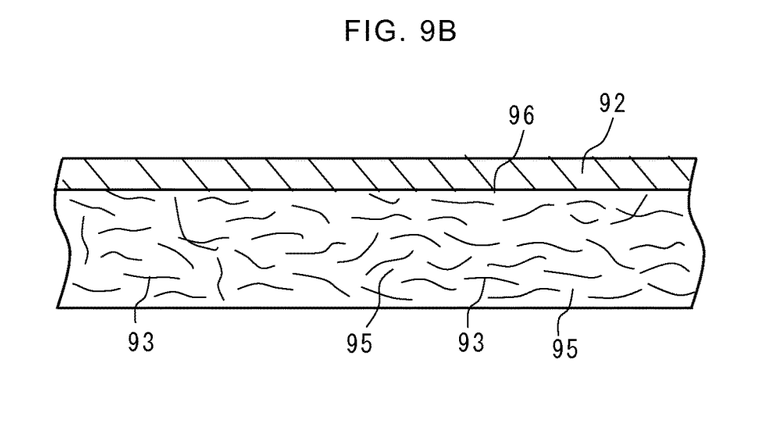
FIG. 9B is a cross-sectional view of a major part of the fiber-reinforced composite shown in FIG. 9A.

In view of these points, Patent Document 1, for example, proposes a fiber-reinforced composite material 9 that is obtained by preparing a first composite material 92 including a woven fibrous substrate 91 and thermoplastic resin as a reinforcement material, and bonding this first composite material 92 and a second composite material 95 including reinforcement fibers 93 arranged at random and thermoplastic resin 94 by hot pressing or the like, and a method for manufacturing the same as illustrated in FIGS. 9A and 9B. In this way, a fiber-reinforced composite material can increase its strength because of the woven fibrous substrate 91 arranged partially.

Related Art Document

Patent Document

Patent Document 1: JP 2005-538864 A

SUMMARY

However, at an interface 96 between the first composite material 92 and the second composite material 95, they are bonded via thermoplastic resins included in these composite materials, meaning that the adhesion strength at the interface 96 is the strength of the thermoplastic resins themselves. If stress such as bending stress is applied to the fiber-reinforced composite material 9, the first composite material 92 and the second composite material 95 are easily separated at the interface therebetween, and so the sufficient effect from the second composite material 95 for reinforcement may not be achieved.

In view of such a point, the present invention aims to provide a fiber-reinforced composite material capable of increasing the adhesive strength between a first composite material layer including a fibrous substrate in which reinforcement fiber bundles are arranged crosswise, and a second composite material layer including second reinforcement fibers that are arranged at random, and a method for manufacturing the same.

In order to solve the above-stated problems, the present invention aims to provide a fiber-reinforced composite material, including: a first composite material layer including: a fibrous substrate including reinforcement fiber bundles crossing, the reinforcement fiber bundles being drawn and aligned first reinforcement fibers; and first thermoplastic resin, with which at least each of the reinforcement fiber bundles is impregnated; and a second composite material layer including second reinforcement fibers that are arranged at random in second thermoplastic resin, wherein the fiber-reinforced composite material includes the first composite material layer and the second composite material layer that are bonded to each other, the first composite material layer has a plurality of bores on at least a surface thereof that is to be bonded with the second composite material layer, and the second reinforcement fibers and the second thermoplastic resin enter into the bores.

According to the present invention, since the second reinforcement fibers and the second thermoplastic resin enter into the bores that are formed on the surface of the first composite material layer that is to be bonded to the second composite material layer, such second reinforcement fibers and the second thermoplastic resin entering into the bores serve to anchor an interface between the first composite material layer and the second composite material layer. Such an anchor effect can suppress the separation of the first composite material layer and the second composite material layer at the interface.

The fibrous substrate may be a woven substrate such as a plain, twill or satin woven substrate, or may be a fibrous substrate that is prepared by stacking substrates (sheets), each including reinforcement fiber bundles (first reinforcement fibers) that are drawn and aligned in one direction, at predetermined angles so that the adjacent reinforcement fibers of the substrates cross each other. The first composite material layer of the present invention may be the one obtained by preparing a fibrous substrate including reinforcement fiber bundles woven therein, for example, followed by impregnation it with the first thermoplastic resin or the one obtained by preparing belt-like composite substrates (prepregs), for example, including reinforcement fiber bundles impregnated with the first thermoplastic resin beforehand and weaving these composite substrates so that the reinforcement fiber bundles making up these composite substrates cross each other.

In a preferable embodiment, the fibrous substrate includes a woven substrate with the reinforcement fiber bundles woven therein, and gaps are provided between the reinforcement fiber bundles of the woven substrate to define the plurality of bores. In this embodiment, since the plurality of bores are formed by providing gaps between the reinforcement fiber bundles of the woven substrate, the first reinforcement fibers of the reinforcement fiber bundles are continuous without being disconnected around the bores as well. As a result, the fiber-reinforced composite material can keep the strength while increasing the adhesiveness between the first composite material layer and the second composite material layer.

In a further preferable embodiment, the fibrous substrate has a structure including lamination of a plurality of woven substrates with the reinforcement fiber bundles woven therein, and a woven substrate to be bonded to the second composite material layer of the plurality of woven substrates has gaps between the reinforcement fiber bundles larger than gaps between the reinforcement fiber bundles of the other woven substrates, to define the plurality of bores.

According to this embodiment, since the second reinforcement fibers and the second thermoplastic resin enter into the plurality of bores of the woven substrate that is to be bonded to the second composite material layer, the adhesiveness between the first composite material layer and the second composite material layer can be kept. On the other hand, in the other woven substrate, reinforcement fiber bundles (first reinforcement fibers) located on the surface side of the fiber-reinforced composite material can be arranged densely as compared with the woven substrate to be bonded to the second composite material, and so the strength of the fiber-reinforced composite material can be increased.

The wording "a woven substrate to be bonded to the second composite material layer having gaps between the reinforcement fiber bundles larger than gaps between the reinforcement fiber bundles of the other woven substrates" in the present invention refers to the state where a plurality of bores are formed by providing gaps between adjacent reinforcement fiber bundles at least in the woven substrate to be bonded to the second composite material layer, including substantially no gaps between the reinforcement fiber bundles of the other woven substrates. In such a case also, the reinforcement fiber bundles making up the woven substrate as stated above is in the state of impregnated with the first thermoplastic resin.

In another preferable embodiment, the bores are through holes that penetrate through the first composite material layer. In this embodiment, since the bores are through holes, the plurality of bores can be easily formed by bore-processing or the like performed to the first composite material layer during the manufacturing.

The present invention discloses the following method for manufacturing a fiber-reinforced composite material as well. A method for manufacturing a fiber-reinforced composite material of the present invention is to manufacture a fiber-reinforced composite material by bonding a first composite material including: a fibrous substrate including reinforcement fiber bundles crossing, the reinforcement fiber bundles being drawn and aligned first reinforcement fibers; and first thermoplastic resin, with which at least each of the reinforcement fiber bundles is impregnated; and a second composite material including second reinforcement fibers that are arranged at random in second thermoplastic resin. The first composite material used includes a plurality of bores formed on a surface thereof to be bonded to the second composite material, and when the first composite material and the second composite material are bonded, at least the second thermoplastic resin is softened so that the second reinforcement fibers and the second thermoplastic resin enter into the bores, followed by pressurizing of the first composite material and the second composite material.

According to the present invention, when the first composite material and the second composite material are bonded, at least the second thermoplastic resin is softened before pressurizing of the first composite material and the second composite material. Since the second reinforcement fibers are arranged at random inside the second composite material, such fibers together with the second thermoplastic resin can easily enter into the bores of the first composite material. In this way, such second reinforcement fibers and second thermoplastic resin entering into the bores serve to anchor an interface between the first composite material and the second composite material, and so the thus obtained fiber-reinforced composite material has high adhesiveness between the first composite material and the second composite material.

In a further preferable embodiment, when the first composite material is manufactured, the reinforcement fiber bundles are woven therein while providing gaps between the reinforcement fiber bundles of the fibrous substrate so as to form the plurality of bores.

According to this embodiment, while a fibrous substrate is manufactured, a plurality of bores can be formed at this fibrous substrate simultaneously. Since the first reinforcement fibers of the thus formed reinforcement fiber bundles are continuous without being disconnected around the bores as well, the strength of the first composite material can be kept.

In a further preferable embodiment, the fibrous substrate is manufactured by stacking a plurality of woven substrates with reinforcement fiber bundles woven therein, and the woven substrates are woven with the reinforcement fiber bundles so that a woven substrate to be bonded to the second composite material of the plurality of woven substrates has gaps between the reinforcement fiber bundle larger than gaps between the reinforcement fiber bundles of the other woven substrates so as to form the plurality of bores.

According to this embodiment, since the second reinforcement fibers and the second thermoplastic resin enter into the plurality of bores of the woven substrate that is to be bonded to the second composite material, the adhesiveness between the first composite material and the second composite material can be kept in the thus obtained fiber-reinforced composite material. On the other hand, in the other woven substrate, reinforcement fiber bundles (first reinforcement fibers) located on the surface side of the fiber-reinforced composite material can be arranged more densely than in the woven substrate to be bonded to the second composite material, and so the strength of the fiber-reinforced composite material can be increased.

It is preferable that the reinforcement fiber bundles before weaving are impregnated with the first thermoplastic resin, and the woven substrate after weaving may be impregnated with (contain) the first thermoplastic resin so as not to block the bores as long as the woven substrate can have the aforementioned gaps.

In a further embodiment, when the first composite material is manufactured, bores are processed so as to penetrate through the fibrous substrate so as to form the plurality of bores. According to this embodiment including through holes as the bores, the plurality of bores can be easily formed by bore-processing or the like performed to the first composite material during the manufacturing for increased productivity.

The present invention can increase the adhesive strength between a first composite material layer including a fibrous substrate in which reinforcement fiber bundles are arranged crosswise, and a second composite material layer including second reinforcement fibers that are arranged at random.

DETAILED DESCRIPTION OF THE EMBODIMENT(S)

The following describes some embodiments of a fiber-reinforced composite material and a method for manufacturing the same according to the present invention, with reference to the drawings.

Embodiment 1

Figure 1:
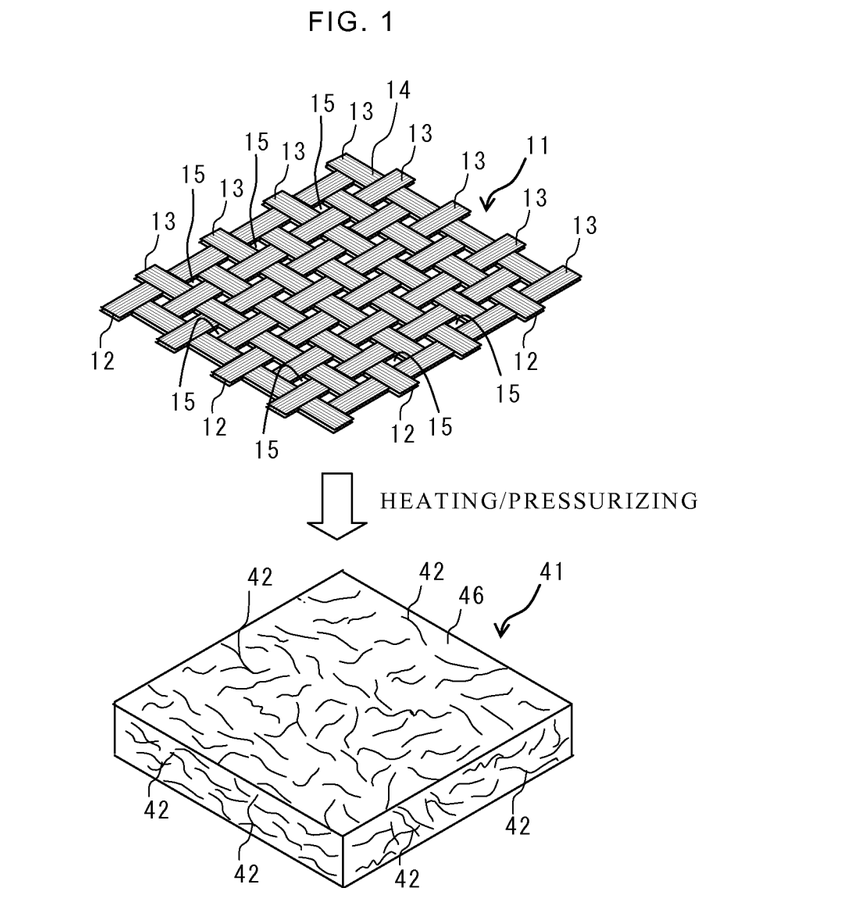
FIG. 1 is a schematic perspective view to describe a method for manufacturing a fiber-reinforced composite material according to Embodiment 1 of the present invention.
Figure 2:
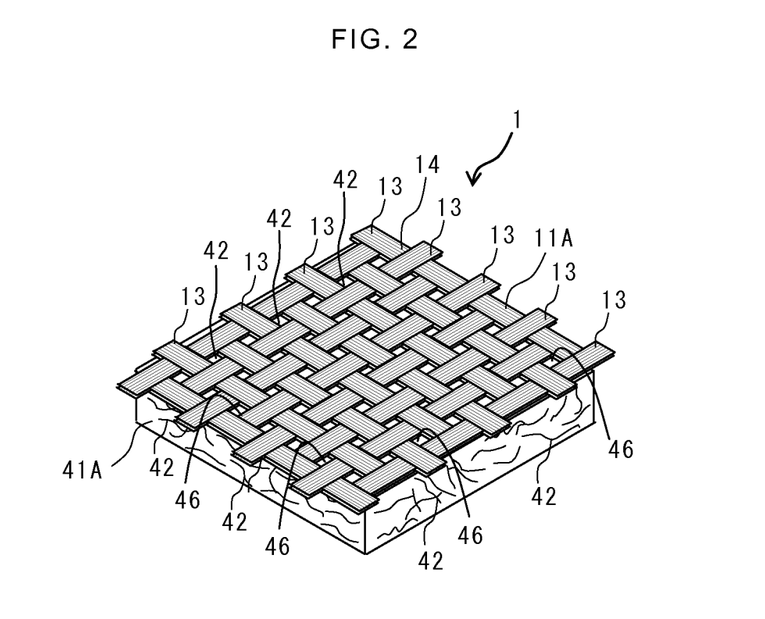
FIG. 2 is a schematic perspective view of a fiber-reinforced composite material that is manufactured by the manufacturing method of FIG. 1.
Figure 3:
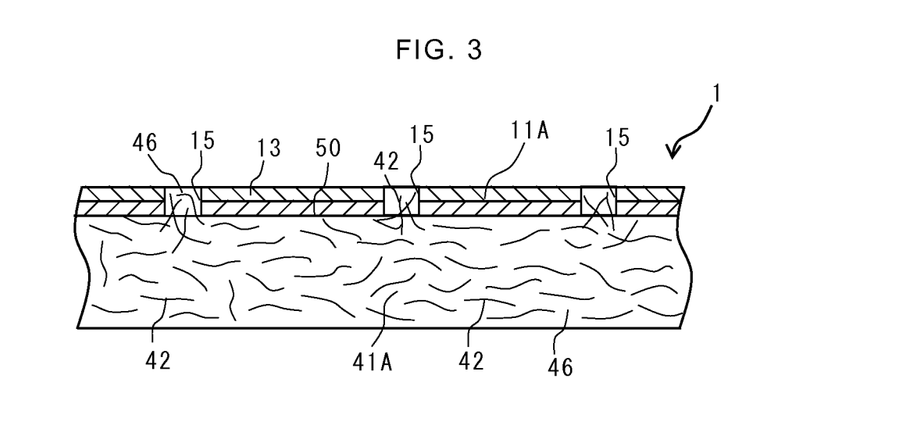
FIG. 3 is a cross-sectional view of a major part of the fiber-reinforced composite material in FIG. 2.

FIG. 1 is a schematic perspective view to describe a method for manufacturing a fiber-reinforced composite material according to Embodiment 1 of the present invention. FIG. 2 is a schematic perspective view of a fiber-reinforced composite material that is manufactured by the manufacturing method of FIG. 1. FIG. 3 is a cross-sectional view of a major part of the fiber-reinforced composite material in FIG. 2.

A fiber-reinforced composite material 1 according to the present embodiment includes a first composite material 11 and a second composite material 41 that are bonded to each other. The first composite material 11 includes a fibrous substrate 14, in which reinforcement fiber bundles 13 that are drawn and aligned first reinforcement fibers 12 are arranged crosswise, and first thermoplastic resin (not illustrated) with which the reinforcement fiber bundles 13 are impregnated. That is, the first reinforcement fibers 12, 12 making up the reinforcement fiber bundles 13 bind together with the first thermoplastic resin as matrix resin.

Specifically, the fibrous substrate 14 of the present embodiment is prepared by weaving the reinforcement fiber bundles 13 in the fibrous substrate 14 so as to provide gaps between adjacent reinforcement fiber bundles 13, 13 thus manufacturing a woven substrate including a plurality of bores 15 therein as the fibrous substrate.

To weave the reinforcement fiber bundles 13 therein, the reinforcement fiber bundles may be opened, for example, and a prepreg sheet or tape including them impregnated with first thermoplastic resin is used, whereby a woven substrate impregnated with the first thermoplastic resin can be manufactured. Alternatively, a woven substrate may be manufactured by weaving reinforcement fiber bundles therein as the woven substrate, followed by impregnation it with the first thermoplastic resin so as not to block a plurality of bores 15.

A fibrous substrate of the present embodiment is a plain woven substrate, which may be other woven substrates such as twill or satin woven substrates.

The second composite material 41 includes second reinforcement fibers 42 arranged at random in second thermoplastic resin 46, where the second reinforcement fibers 42 bind together with the second thermoplastic resin 46 as matrix resin. The second composite material 41 can be manufactured by kneading the second reinforcement fibers 42 into the molten second thermoplastic resin 46, followed by molding such as injection molding.

Herein, the first and the second reinforcement fibers in the present embodiment may be fibers for reinforcement of thermoplastic resin to reinforce the mechanical strength of the composite materials. Examples of such reinforcement fibers may include glass fibers, carbon fibers, aramid fibers, alumina fibers, boron fibers, steel fibers, PBO fibers and high-strength polyethylene fibers. The first reinforcement fibers are continuous fibers, and reinforcement fiber bundles refer to a bundled state of the first reinforcement fibers, including an opened state of the reinforcement fiber bundles as well as stated above. Preferably the first and the second reinforcement fibers have a diameter of 6 to 30 μm, and the second reinforcement fibers have a length of 0.5 mm to 30 mm.

The first and the second thermoplastic resins may be of any type as long as they are able to keep the adhesiveness between the first composite material 11 and the second composite material 41, which may be of the same type. Examples thereof may include olefin-based resin, polyamide-based resin, epoxy-based resin, polyimide-based resin, nylon-based resin, poly-carbonate based resin, acrylic-based resin or ABS-based resin. Their types are not limited particularly as long as they can keep a predetermined strength together with the reinforcement fibers.

The first composite material 11 and the second composite material 41 are placed in a mold, which then undergoes hot pressing for bonding of them. Specifically, the first composite material 11 is formed with the plurality of bores 15 at the surface to be bonded with the second composite material 41, and at least the second thermoplastic resin 46 is heated for softening so that the second reinforcement fibers 42 and the second thermoplastic resin 46 can enter into these bores 15, followed by pressurizing of the first composite material 11 and the second composite material 41. In the present embodiment, both of the first composite material 11 and the second composite material 41 are placed into a mold for hot pressing, followed by pressurizing while applying heat to them. Since the second reinforcement fibers 42 are reinforcement fibers that are arranged at random inside the second composite material 41, such fibers together with the second thermoplastic resin can easily enter into the bores of the first composite material 11.

As a result, as illustrated in FIG. 2 and FIG. 3, the fiber-reinforced composite material 1, which is obtained by bonding the first composite material 11 and the second composite material 41, includes a first composite material layer 11A and a second composite material layer 41A bonded thereto, where the first composite material layer 11A serves as a reinforcement part of the second composite material layer 41A.

Since the second reinforcement fibers 42 and the second thermoplastic resin 46 enter into the bores 15 that are formed on the surface of the first composite material layer 11A that is to be bonded to the second composite material layer 41A, such second reinforcement fibers 42 and second thermoplastic resin 46 entering into the bores 15 serve to anchor an interface 50 between the first composite material layer 11A and the second composite material layer 41A. Such an anchor effect can suppress the separation of the first composite material layer 11A and the second composite material layer 41A at the interface 50.

Since gaps are provided between adjacent reinforcement fiber bundles 13, 13 of the woven substrate to form the plurality of bores 15, the first reinforcement fibers 12 of the reinforcement fiber bundles 13 are continuous without being disconnected around the bores as well. As a result, the first composite material layer 11A can keep the strength.

Embodiment 2

Figure 4:
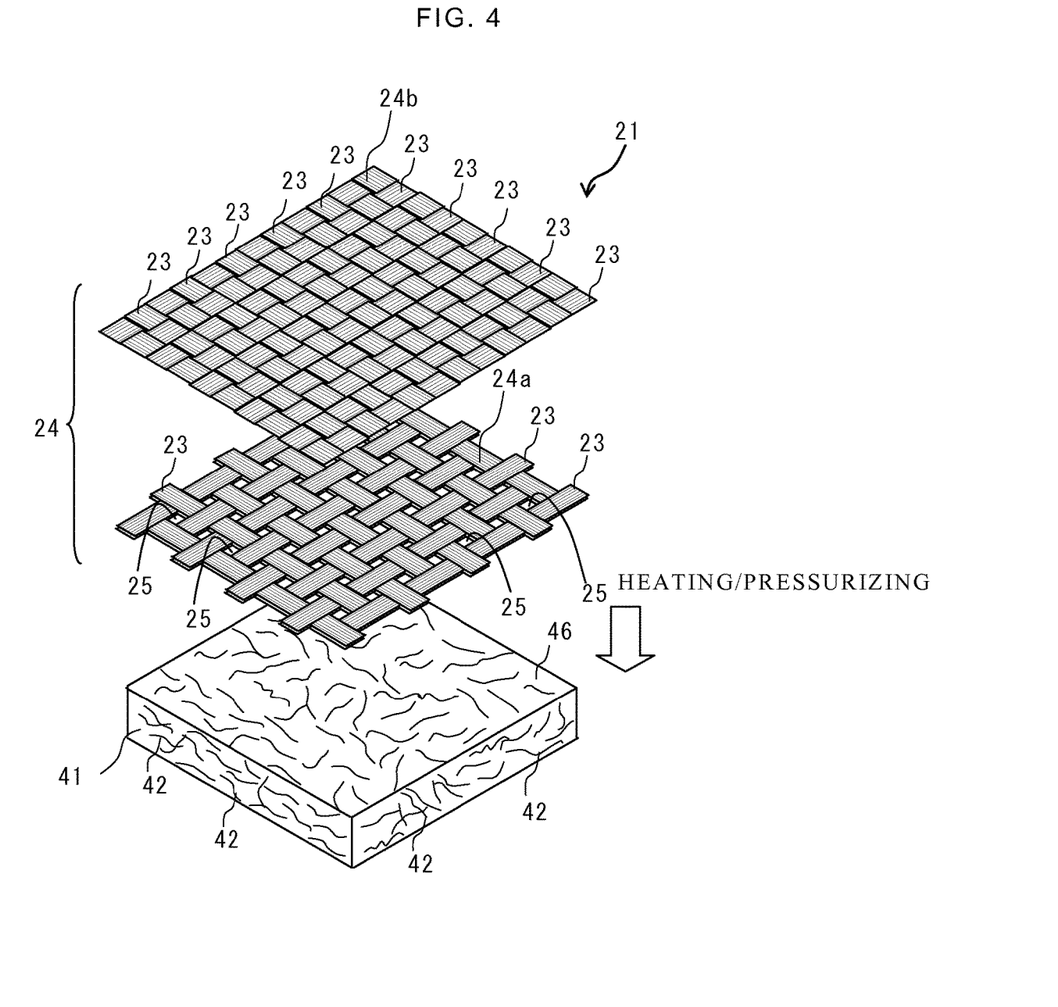
FIG. 4 is a schematic perspective view to describe a method for manufacturing a fiber-reinforce composite material according to Embodiment 2 of the present invention.
Figure 5:
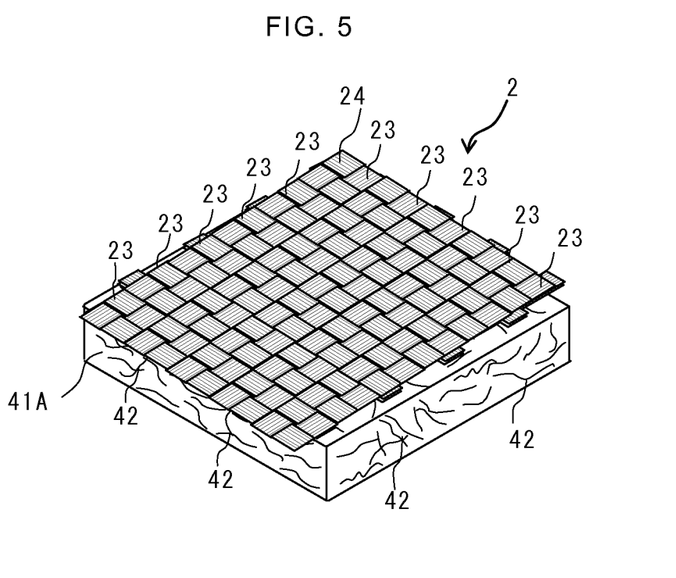
FIG. 5 is a schematic perspective view of a fiber-reinforced composite material that is manufactured by the manufacturing method of FIG. 4.
Figure 6:
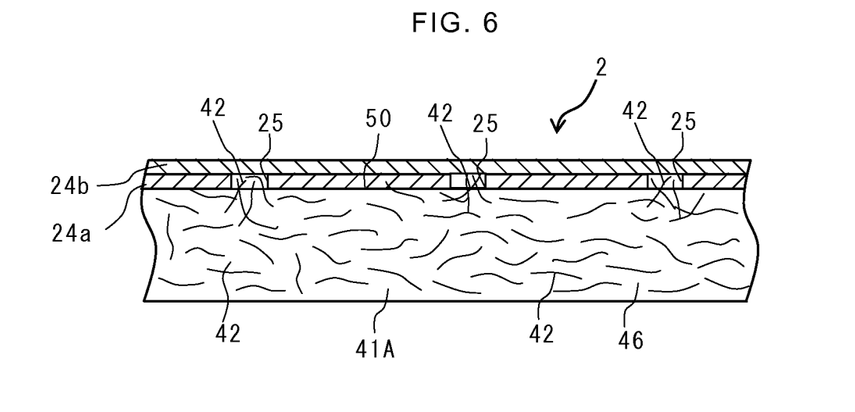
FIG. 6 is a cross-sectional view of a major part of the fiber-reinforced composite material in FIG. 5.

FIG. 4 is a schematic perspective view to describe a method for manufacturing a fiber-reinforce composite material according to Embodiment 2 of the present invention. FIG. 5 is a schematic perspective view of a fiber-reinforced composite material that is manufactured by the manufacturing method of FIG. 4. FIG. 6 is a cross-sectional view of a major part of the fiber-reinforced composite material in FIG. 5.

The fiber-reinforced composite material according to Embodiment 2 is different from that of Embodiment 1 in the shape of the first composite material (layer). The following describes the different points in details, and the same reference numerals are assigned to other common configuration to omit their descriptions.

As illustrated in FIG. 4, a fibrous substrate 24 making up a first composite material 21 according to the present embodiment includes the lamination of two (a plurality of) woven substrates 24a and 24b, into which reinforcement fiber bundles 23, 23 are woven. Specifically, each of the woven substrates 24a and 24b is manufactured as the first composite material 21 by weaving tapes therein, the tapes including reinforcement fiber bundles impregnated with first thermoplastic resin.

The two woven substrates 24a and 24b are woven so that the woven substrate 24a to be bonded to a second composite material layer 41A has a gap between their adjacent reinforcement fiber bundles 23, 23 larger than a gap between the adjacent reinforcement fiber bundles 23, 23 of the woven substrate 24b, thus forming a plurality of bores 25, 25 in the woven substrate 24a.

Specifically, the woven substrate 24b of the present embodiment does not have a gap between their adjacent reinforcement fiber bundles 23, 23. Although the woven substrate 24b in this case does not have a gap between their adjacent reinforcement fiber bundles 23, 23, it may have a gap between the adjacent reinforcement fiber bundles 23, 23 of the woven substrate 24b as long as the relationship of the magnitude with the gap in the woven substrate 24a can hold.

In this way, as illustrated in FIG. 5 and FIG. 6, the thus obtained fiber-reinforced composite material 2 can realize the adhesiveness between the first composite material (layer) 21 and the second composite material (layer) 41 because it includes the woven substrate 24a bonded to the second composite material. On the other hand, in the woven substrate 24b, reinforcement fiber bundles (first reinforcement fibers) located on the surface side of the fiber-reinforced composite material 2 can be arranged densely as compared with the woven substrate 24a to be bonded to the second composite material 41, and so the strength of the fiber-reinforced composite material 2 can be increased.

Embodiment 3

Figure 7A:
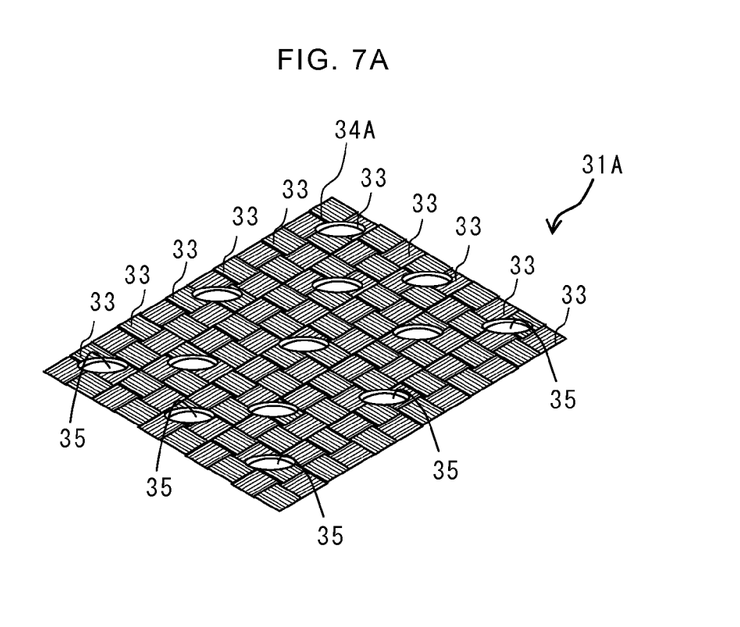
FIG. 7A is a schematic perspective view of a first composite material according to Embodiment 3 of the present invention.
Figure 7B:
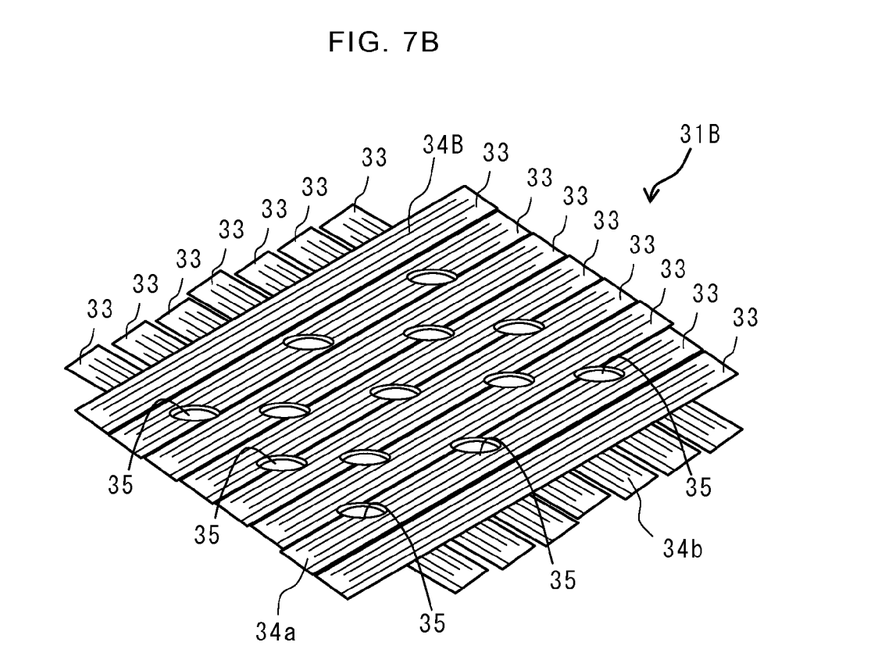
FIG. 7B is a schematic perspective view of a modification example thereof.

FIG. 7A is a schematic perspective view of a first composite material according to Embodiment 3 of the present invention, and FIG. 7B is a schematic perspective view of a modification example thereof. The fiber-reinforced composite material according to Embodiment 3 is different from that of Embodiment 1 in the shape of the first composite material (layer). Then, the following describes the first composite material only as the different point as illustrated in FIGS. 7A and 7B, and the detailed descriptions of other common configuration are omitted.

As illustrated in FIG. 7A, a fibrous substrate 34A according to the present embodiment includes a woven substrate, in which reinforcement fiber bundles 33 are woven without gaps, and a plurality of bores 35 are further formed at the fibrous substrate 34A. Such bores 35 can be formed by, during the preparation of a first composite material 31, processing bores so as to penetrate through the first composite material 31A (fibrous substrate 34A). Since each bore 35 is a through-hole, such a plurality of bores 35, 35 can be easily formed by bore-processing performed to the first composite material 31, for example, at the time of manufacturing, whereby the productivity can be enhanced.

As illustrated in FIG. 7B, a fibrous substrate 34B is manufactured by stacking substrates 34a, 34b, each including the reinforcement fiber bundles 33 that are drawn and aligned in one direction, at predetermined angles so that the adjacent reinforcement fibers 33 of the substrates 34a, 34b cross each other, and then bores may be processed so as to penetrate through the first composite material 31B (fibrous substrate) 34B. This can from a plurality of bores 35, 35 at the first composite material 31B by a simpler manufacturing method.

EXAMPLES

The following describes examples of the present invention.

Example 1

As one example of Embodiment 1, the following first composite material was manufactured. Specifically, tapes (carbon content of 50 mass %) of 5 mm in width made of reinforcement fiber bundles that were drawn and aligned reinforcement fibers (carbon) impregnated with thermoplastic resin (polyamide) were woven at the intervals of 5 mm to be a woven substrate, and four of such woven substrates were stacked to prepare a first composite material. Next, a second composite material was prepared, having a thickness in the range of 2 mm, in which reinforcement fibers (carbon) were arranged at random in thermoplastic resin (polyamide). After heating the first and the second composite materials at 260° C., pressure was applied at 10 MPa for bonding.

Example 2

As one example of Embodiment 2, the following first composite material was manufactured. Specifically, two of woven substrates, in each of which the tapes of Example 1 were woven without gaps, were stacked, on which two of woven substrates including the tapes woven at the intervals of 5 mm were further stacked, thus manufacturing a first composite material to be a fiber-reinforced composite material.

Next, the same second composite material as in Example 1 was prepared, and the woven substrate having gaps therein of the first composite material and the second composite material were brought into contact. In this state, they were bonded under the same heating and pressuring conditions as those of Example 1, whereby a fiber-reinforced composite material having the same dimensions of those of the fiber-reinforced composite material of Example 1 was prepared.

Example 3

As one example of Embodiment 3, the following first composite material was manufactured. Specifically, a woven cloth-form first composite material (TEPEX:BOND, produced by LAMINATES corporation, containing polyamide as thermoplastic resin) containing 45 mass % of carbon fibers was prepared, and bore-processing was performed thereto so that the bores had a diameter of 6 mm and the entire-bore area ratio was 20%, thus preparing a first composite material. Next, the same second composite material as in Example 1 was prepared, and the first composite material and the second composite material were bonded under the same heating and pressuring conditions as those of Example 1, whereby a fiber-reinforced composite material having the same dimensions of those of the fiber-reinforced composite material of Example 1 was prepared.

Comparative Example 1

A fiber-reinforced composite material was prepared similarly to Example 1. This example differed from Example 1 in that it did not have the first composite material layer.

Comparative Example 2

A fiber-reinforced composite material was prepared similarly to Example 3. This example differed from Example 3 in that it did undergo bore-processing to the first composite material layer.

(Bending Strength Test)

Figure 8:
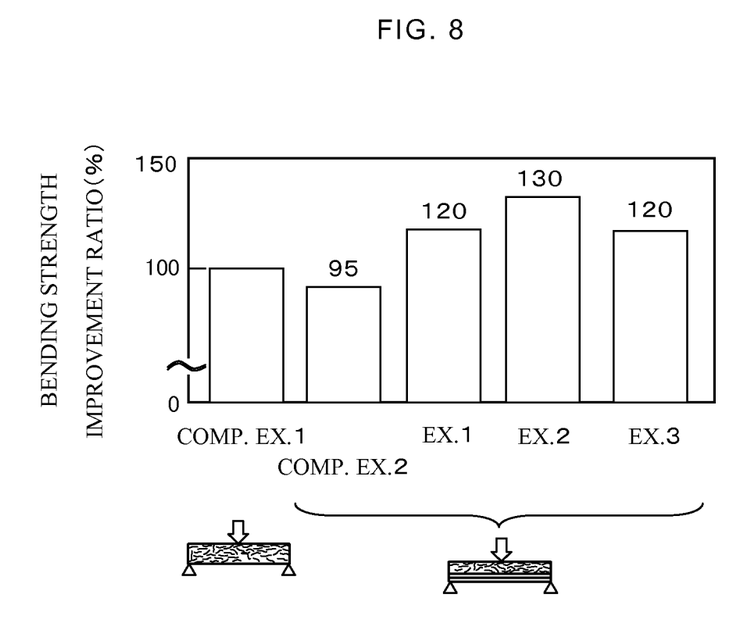
FIG. 8 indicates the result of bending test of test pieces according to Examples 1 to 3 and Comparative Examples 1 and 2.

The fiber-reinforced composite materials of Examples 1 to 3 and Comparative Examples 1 and 2 were cut into test pieces of 35 mm, 100 mm and 2 mm, and a bending test was performed by the three-points bending test complying with JIS K-7017 so as to apply load thereto from the center on the second composite material layer side. FIG. 8 shows the results. FIG. 8 indicates the ratios of improvement in bending strength with the strength of Comparative Example 1 by the bending test set at 1 (100%), where the indicated values are the measurements of the bending strength that were divided by the total weight.

(Results)

The test pieces of Examples 1 to 3 showed improved bending strength as compared with Comparative Examples 1 and 2, and so it can be said that the peeling strength between the first and the second composite material layers was improved. Presumably this is because, in the case of Examples 1 to 3, the reinforcement fibers of the second composite material and the thermoplastic resin entered into the plurality of bores in the first composite material layer in the vicinity of the interface between the first and the second composite material layers.

According to the experiment conducted by the present inventors, in the case of Example 1, the intervals between the tapes during weaving were preferably in the range of 0.5 mm to 10 mm. When the intervals are less than 0.5 mm, the second reinforcement fibers and the second thermoplastic resin do not enter into the bores of the first composite material sufficiently. On the other hand, when the intervals exceed 10 mm, it is difficult to hold the shape of the first composite material, and even when it can be manufactured, it is difficult to handle it during the bonding to the second composite material.

That is a detailed description of the embodiments of the present invention. However, the present invention is not limited to the above-stated embodiments, and the design may be modified variously without departing from the spirits of the present invention defined in the attached claims.

For instance, Embodiment 1 includes a single-layered woven substrate impregnated with thermoplastic resin as the first composite material. Instead, the lamination of woven substrates may be used as the first composite material as long as bores are not blocked.

DESCRIPTION OF SYMBOLS

1, 2 Fiber-reinforced composite material
11, 21, 31, 31A, 31B First composite material
11A, 21A First composite material layer
12 First reinforcement fibers
13, 23, 33 Reinforcement fiber bundles
14, 24, 34A, 34B Fibrous substrate
15, 25, 35 Bores
24a, 24b Woven substrate
41 Second composite material
41A Second composite material layer
42 Second reinforcement fibers
46 Second thermoplastic resin

What is claimed is:

1. A fiber-reinforced composite material, comprising:
   a first composite material layer including: a fibrous substrate including reinforcement fiber bundles crossing, the reinforcement fiber bundles being drawn and aligned first reinforcement fibers; and first thermoplastic resin, with which at least each of the reinforcement fiber bundles is impregnated; and
   a second composite material layer including second reinforcement fibers that are arranged at random in second thermoplastic resin, wherein
   the fiber-reinforced composite material includes the first composite material layer and the second composite material layer that are bonded to each other,
   the first composite material layer has a plurality of bores on at least a surface thereof that is to be bonded with the second composite material layer,
   the second reinforcement fibers and the second thermoplastic resin enter into the bores and
   the fibrous substrate has a structure including lamination of a plurality of woven substrates with the reinforcement fiber bundles woven therein, and a woven substrate to be bonded to the second composite material layer of the plurality of woven substrates has gaps between the reinforcement fiber bundles larger than gaps between the reinforcement fiber bundles of the other woven substrates, to define the plurality of bores.

2. The fiber-reinforced composite material according to claim 1, wherein the bores are through holes that penetrate through the first composite material layer.

3. A method for manufacturing a fiber-reinforced composite material by bonding a first composite material including: a fibrous substrate including reinforcement fiber bundles crossing, the reinforcement fiber bundles being drawn and aligned first reinforcement fibers; and first thermoplastic resin, with which at least each of the reinforcement fiber bundles is impregnated; and a second composite material including second reinforcement fibers that are arranged at random in second thermoplastic resin, wherein the first composite material used includes a plurality of bores formed on a surface thereof to be bonded to the second composite material, when the first composite material and the second composite material are bonded, at least the second thermoplastic resin is softened so that the second reinforcement fibers and the second thermoplastic resin enter into the bores, followed by pressurizing of the first composite material and the second composite material and the fibrous substrate is manufactured by stacking a plurality of woven substrates with reinforcement fiber bundles woven therein, and the woven substrates are woven with the reinforcement fiber bundles so that a woven substrate to be bonded to the second composite material of the plurality of woven substrates has gaps between the reinforcement fiber bundles larger than gaps between the reinforcement fiber bundles of the other woven substrates so as to form the plurality of bores.

4. The method for manufacturing a fiber-reinforced composite material according to claim 3, wherein when the first composite material is manufactured, bores are processed so as to penetrate through the fibrous substrate so as to form the plurality of bores.

* * * * *